(12) United States Patent
Gougel et al.

(10) Patent No.: US 6,866,750 B1
(45) Date of Patent: Mar. 15, 2005

(54) DEVICE FOR DESALINATION OF WATER AND METHODS OF USE

(75) Inventors: Michail Gougel, Vårby (SE); Mark Novikov, St. Petersburg (RU)

(73) Assignee: Gougel Industri AB, Alvsjo (SE)

( * ) Notice: Subject to any disclaimer, the term of this patent is extended or adjusted under 35 U.S.C. 154(b) by 272 days.

(21) Appl. No.: 10/129,109

(22) PCT Filed: Nov. 8, 2000

(86) PCT No.: PCT/SE00/02183

§ 371 (c)(1),
(2), (4) Date: Jul. 16, 2002

(87) PCT Pub. No.: WO01/34267

PCT Pub. Date: May 17, 2001

(30) Foreign Application Priority Data

Nov. 11, 1999 (SE) .............................................. 9904083

(51) Int. Cl.⁷ .............................. B01D 9/02; C02F 1/00; C02F 103/08
(52) U.S. Cl. .......................... 203/10; 159/45; 159/47.1; 62/532; 203/48; 203/100; 203/DIG. 17; 210/177; 210/198.1; 210/634; 210/750; 585/15
(58) Field of Search ............................ 203/10, 48, 100, 203/DIG. 17; 196/111; 159/45, 47.1; 585/15; 62/532; 210/177, 198.1, 750, 634; 202/158

(56) References Cited

U.S. PATENT DOCUMENTS

| | | | | |
|---|---|---|---|---|
| 3,402,753 | A | * | 9/1968 | Thomas ...................... 159/47.1 |
| 6,565,715 | B1 | * | 5/2003 | Max ............................ 203/10 |
| 6,673,249 | B2 | * | 1/2004 | Max ........................... 210/747 |
| 6,733,667 | B2 | * | 5/2004 | Max ........................... 210/177 |

FOREIGN PATENT DOCUMENTS

| | | |
|---|---|---|
| SU | 487021 | 2/1976 |
| SU | 755755 | 8/1980 |

* cited by examiner

*Primary Examiner*—Virginia Manoharan
(74) *Attorney, Agent, or Firm*—Jacobson Holman PLLC

(57) ABSTRACT

The present invention provides a device and method for desalinating saltwater which utilizes a heatable vessel wherein is placed a sufficient quantity of a salt which will absorb water of crystallisation and which has a dissolution index of not higher than $10^{-24}$. Saltwater is then added to the vessel and brought into contact with the salt, so that the salt will bind water from the saltwater and form a crystal hydrate. The excess saltwater with salt concentrate is drained from the vessel. The salt which has absorbed water tom the saltwater and formed a crystal hydrate is then heated in the vessel, and the pure water from the crystal hydrate is released as water vapour, which is collected and cooled to obtain desalinated water.

6 Claims, 1 Drawing Sheet

DEVICE FOR DESALINATION OF WATER AND METHODS OF USE

This is a nationalization of PCT/SE00/02183 filed Nov. 8, 2000 and published in English.

FIELD OF INVENTION

The present invention relates to a process and to a device for the desalination of water, for use in domestic or industrial water desalination processes, for instance.

DESCRIPTION OF THE BACKGROUND ART

Saltwater desalination devices are known to industry, these devices generating distilled water obtained by boiling saltwater. These known devices comprise a closed vessel that includes heatable elements and are intended to receive salt water and to discharge vapour (steam) and salt concentrate. The saltwater desalinating devices known at present require a significant energy input, due to the fact that it is necessary to heal all of the saltwater present. Heat loss also increases in conjunction with this heating process as a result of salt-deposits on the pipes that deliver heat to the saltwater. Unless handled properly, the salt concentrate formed in the desalination process can deleteriously affect the environment when collected and later dumped.

SUMMARY OF THE INVENTION

The object of the present invention is to reduce energy consumption and to improve the use of the heat applied and, at the same time, to prevent dirtying of the ambient environment when taking care of rest products from the desalination process. In accordance with the invention, this object is achieved with a water desalinating process and a water desalinating device that differ from earlier known systems and devices by virtue of supplying saltwater to an hermetically closed vessel that has been divided vertically into two parts by a perforated partition wall. A layer of salt that absorbs water of crystallisation has been placed in the upper part of the vessel over said perforated partition wall and in contact with heatable elements located in said upper part of the vessel. Means for collecting the salt concentrate have been disposed in the bottom part of the vessel, beneath said perforated partition wall. Pipes that function to supply saltwater and carry away water vapour, steam, have been connected to the upper part of the vessel above said salt layer. A pipe for carrying away rest products, such as the saline concentrate, have been connected to the bottom part of the vessel. The salt that absorbs water of crystallisation is preferably one that has a dissolution index (dissolution capacity) of not higher than $10^{-24}$, for instance $Mg_3(PO_4)_2 \cdot n H_2O$ (n=12–22). The upper part of the vessel is preferably coupled to a low pressure source. When saltwater is delivered to the vessel, the salt that absorbs water of crystallisation will absorb water and form a crystal hydrate. After stopping the supply of saltwater and heating the crystal hydrate, the hydrate will emit the absorbed water as water vapour, which can then be condensed to obtain distilled water. A new desalination process can be started, subsequent to this heating and water-emitting process.

DESCRIPTION OF A WORKING EMBODIMENT

Figure 1:
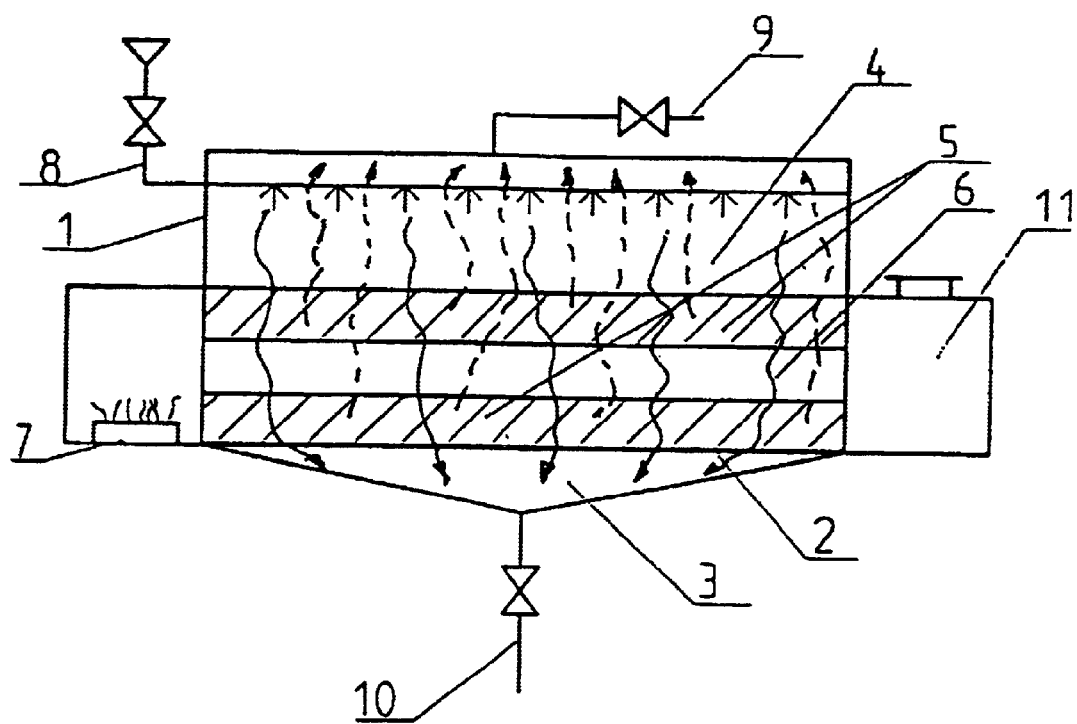
FIG. 1 illustrates schematically the construction of an inventive desalination device.

The inventive saltwater desalinating device is comprised of an hermetic vessel 1 provided with a perforated partition wall 2 that divides the vessel vertically into two parts, a bottom part 3 and a top part 4. Disposed in the top part 4 of the vessel above the perforated partition wall 2 are heatable elements 6 and a layer of salt 5 that will absorb water of crystallisation, said salt being in direct contact with the heatable elements 6, wherein said elements are connected to an energy source 7 with the ability to ventilate away generated heat 11. Saltwater is delivered to the vessel 1 through a closeable pipe 8, and a closeable pipe 9 is provided for carrying away water vapour, said pipes being placed in the upper part 4 of the vessel, above the salt layer 5. A pipe 10 is provided for carrying away salt concentrate that has collected in the lower part 3 of the vessel as residues from the absorption of water by the absorption salt 5.

The device operates in the following way: Saltwater to be desalinated is delivered to the pipe 8 connected to the upper part 4 of the vessel 1. The saltwater passes through the layer of salt 5 that absorbs the water of crystallisation, wherewith pure desalinated water is bound to the salt, which therewith forms a crystal hydrate. The remainder of the saltwater delivered to the vessel, said % water now having a higher salt concentration, is carried away from the bottom part 3 of the vessel through the pipe 10. Heal is then applied to the layer of crystal hydrate 5 through the heatable element 6 from the heat source 7, wherewith heating of the layer 5 causes said layer to emit the water that the salt absorbing the water of crystallisation has earlier bound to itself to form a hydrate. Any surplus heat is ventilated out through the device 11. The water restored from the hydrate is emitted in vapour form through the pipe 9. Cooling of this vapour converts the vapour into distilled water. A further desalination process can be carried out upon completion of a preceding desalination process. Because the crystal hydrate need only be heated after having bound pure water from the saltwater and because remaining liquid can be carried away, less heat is required to obtain the same amount of distilled water than that required in the earlier known devices, in which it is necessary to heat all of the saltwater. The separated, collected and discharged salt concentrate need never be heated, said heating process being used solely to heat the formed crystal hydrate. Moreover, there is no time-related increase in heat losses, owing to the fact that no salt will coat the heatable elements and pipes. Trials have shown that a suitable salt that absorbs water of crystallisation is one that has a dissolution index of not higher than $10^{-24}$, since otherwise the need to add new crystals becomes greater. $Mg_3(PO_4)_2 \cdot n H_2O$ (n=12–22) is an example of a suitable salt in the present context, although it will be understood that other salts capable of absorbing water of crystallisation can be used.

The provision of sensors in different parts of the device enable different operating conditions to be registered in a desalination process. The desalination process can be controlled, either manually or automatically, with the aid of a computing and monitoring system on the basis of the registered operating conditions. Electrical energy generated by solar cells can be used to heat the heatable elements, in addition to conventional energy sources, therewith enabling a small portable desalination device that includes solar cells to be used to produce pure water under simple conditions, such as when living in the open air in the countryside, for instance.

The saltwater flow is indicated with full arrows, while the vapour flow is indicated with broken arrows in the drawing.

Reference Signs

1 Hermetic vessel
2 Perforated partition wall

3 Bottom part
4 Top part
5 Layer of crystals
6 Heatable elements
7 Heating source
8 Saltwater delivery pipe
9 Vapour discharge pipe
10 Liquid discharge pipe
11 Heat ventilation

What is claimed is:

1. A method for the desalination of water in a vessel containing heating elements and wherein remaining matter can be collected and discharged from said vessel, comprising:
  a) adding a layer of salt to said vessel wherein said salt will absorb water of crystallisation, has a dissolution index of not higher than $10^{-24}$, and which binds water as water of crystallisation when coming into contact with saltwater;
  b) adding a sufficient quantity of saltwater to the vessel;
  c) said salt subsequently absorbs water of crystallisation from the saltwater, binds said water and forms a crystal hydrate;
  d) the remaining saltwater and excess salt forms a liquid concentrate which is drained out of the vessel through a pipe (10);
  e) beating said vessel with the aid of heating elements, so that the water bound to the salt as a crystal hydrate is released from the salt as water vapor which exits the vessel; and
  f) the water vapor of step (e) is then collecting and cooling to obtain desalinated water.

2. The method according to claim 1, wherein said salt is $Mg_3(PO_4)_2 \cdot nH_2O$ (n=12–22).

3. A water desalinating device comprising:
  a hermetically sealable vessel (1) containing heating elements (6); and having upper and lower parts;
  a layer (5) of a salt that will absorb water of crystallisation disposed in the upper part (4) of the vessel;
  a perforated partition wall (2) disposed in said vessel beneath said salt layer (5);
  wherein said heating elements (6), are located within the salt layer (5) above the perforated partition wall (2) and connected to an energy source (7);
  a closeable saltwater supply pipe (8) connected to said vessel;
  a closeable vapour discharge pipe (9) connected to said vessel; and
  a closeable pipe (10) connected to the bottom part (3) of said vessel for the discharge of liquid, such as saltwater enriched with said salt.

4. The device according to claim 3, wherein said salt is $Mg_3(PO_4)_2 \cdot nH_2O$ (n=12–22).

5. The device according to claim 3, further comprising a low pressure source which is connected to the upper part (4) of said vessel.

6. The device according to claim 4 further comprising a low pressure source which is connected to the upper part (4) of said vessel.

* * * * *